US012659818B2

(12) United States Patent　　　(10) Patent No.: US 12,659,818 B2
Kim　　　　　　　　　　　　　　(45) Date of Patent: Jun. 16, 2026

(54) METHOD AND APPARATUS FOR DETERMINING AN INITIAL STATE OF A SECONDARY CELL GROUP IN A WIRELESS COMMUNICATION SYSTEM

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 18/287,343

(22) PCT Filed: May 9, 2022

(86) PCT No.: PCT/KR2022/095096
§ 371 (c)(1),
(2) Date: Oct. 18, 2023

(87) PCT Pub. No.: WO2022/240273
PCT Pub. Date: Nov. 17, 2022

(65) Prior Publication Data
US 2024/0205765 A1　　Jun. 20, 2024

(30) Foreign Application Priority Data
May 12, 2021　(KR) ........................ 10-2021-0061442

(51) Int. Cl.
*H04W 36/00*　　(2009.01)
*H04W 36/36*　　(2009.01)

(52) U.S. Cl.
CPC . *H04W 36/00692* (2023.05); *H04W 36/0069* (2018.08); *H04W 36/0072* (2013.01); *H04W 36/00835* (2018.08); *H04W 36/362* (2023.05)

(58) Field of Classification Search
CPC ....... H04W 36/00692; H04W 36/0069; H04W 36/00835; H04W 36/362; H04W 36/0072
See application file for complete search history.

(56) References Cited

U.S. PATENT DOCUMENTS

2021/0099926 A1　4/2021　Chen et al.
2022/0046522 A1*　2/2022　Kim ...................... H04W 48/16
(Continued)

FOREIGN PATENT DOCUMENTS

EP　　　3910985 A1　11/2021
WO　　2020/144919 A1　7/2020

OTHER PUBLICATIONS

Extended European Search Report in European Appln. No. 22807920. 8, mailed on Apr. 10, 2025, 13 pages.
(Continued)

*Primary Examiner* — Margaret G Webb
(74) *Attorney, Agent, or Firm* — Fish & Richardson P.C.

(57)　　　ABSTRACT

A method and apparatus for determining an initial state of a Secondary Cell Group in a wireless communication system is provided. A wireless device performs conditional PSCell change procedure from a current PSCell to the target PSCell based on determining that the execution condition is met. The conditional PSCell change procedure includes determining the initial state of the target PSCell. The initial state of the target PSCell is determined as the specific state, while the validity timer is running. The initial state of the target PSCell is determined same as a current state of the current PSCell, after the validity timer expires.

20 Claims, 12 Drawing Sheets receiving, from a network, a conditional Primary SCG Cell (PSCell) change configuration related to a target PSCell including (1) an execution condition and (2) information informing a specific state of the target PSCell, as an initial state of the target PSCell, and a validity timer　～S1001 performing a conditional PSCell change procedure from a current PSCell to the target PSCell based on determining that the execution condition is met　～S1002

(56)　　　　　　References Cited

U.S. PATENT DOCUMENTS

2023/0232494 A1 *　7/2023　Wang ................... H04W 76/15
　　　　　　　　　　　　　　　　370/329
2023/0371109 A1 *　11/2023　Jang .................... H04B 17/328
2024/0057216 A1 *　2/2024　Wu ....................... H04W 76/34

OTHER PUBLICATIONS

Huawei (rapporteur), "[AT112-e][230][eDCCA] Progressing FFS points of efficient SCG activation and deactivation (Huawei)," R2-2010733, 3GPP TSG-RAN WG2#112-e, Online, Nov. 2-13, 2020, 22 pages.
Ericsson, "Conditional PSCell Addition Change," 3GPP TSG-RAN WG2 #114e, R2-2105897, Electronic meeting, May 19-May 27, 2021, 16 pages.
Ericsson, "Support of conditional PSCell change/addition," 3GPP TSG-RAN WG3 Meeting #112-e, R3-212358, May 17-27, 2021, Online, 10 pages.
International Search Report and Written Opinion in International Appln. No. PCT/KR2022/095096, mailed on Aug. 12, 2022, 3 pages.
LG Electronics Inc., "Deactivation of SCG," 3GPP TSG-RAN WG2 Meeting #114-e, R2-2106106, Online, May 19-27, 2021, 5 pages.
VIVO, "UE behavior when SCG is deactivated," 3GPP TSG-RAN WG2 Meeting #114 electronic, R2-2105628, Online, May 19-27, 2021, 12 pages.

* cited by examiner

Figure 3:
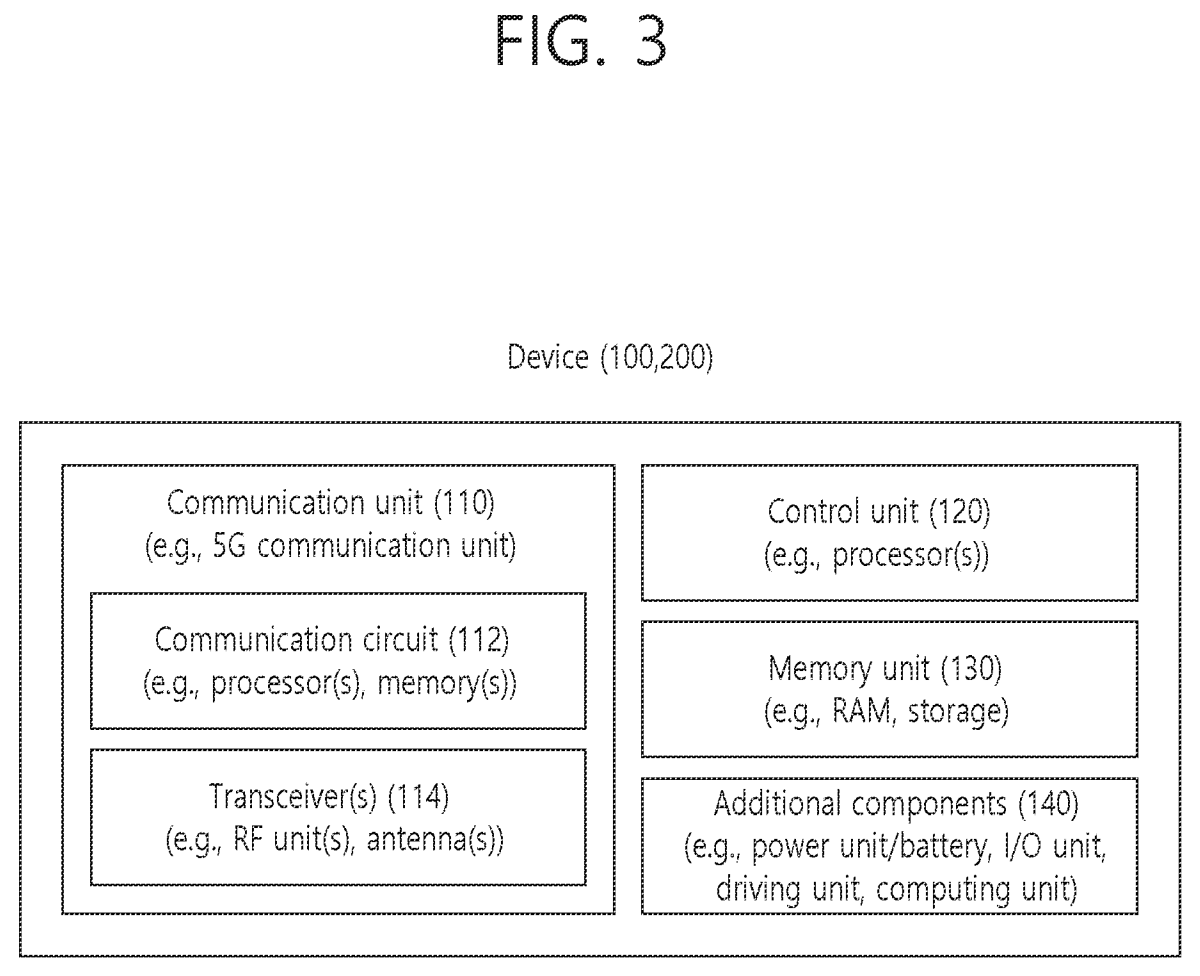

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

Figure 10:
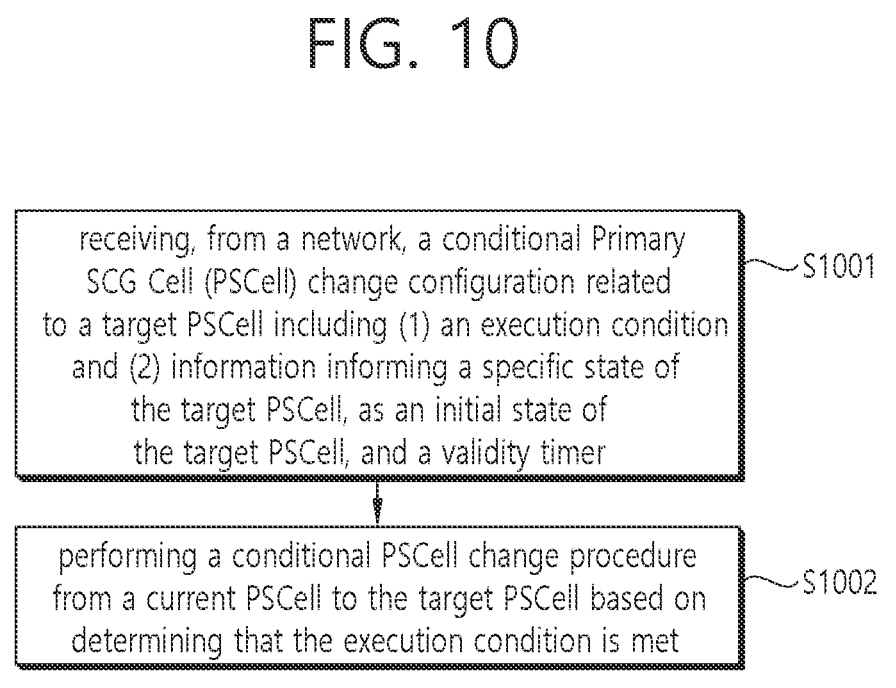

FIG. 10 receiving, from a network, a conditional Primary
SCG Cell (PSCell) change configuration related
to a target PSCell including (1) an execution condition
and (2) information informing a specific state of
the target PSCell, as an initial state of
the target PSCell, and a validity timer ~S1001 performing a conditional PSCell change procedure
from a current PSCell to the target PSCell based on
determining that the execution condition is met ~S1002

Figure 12:
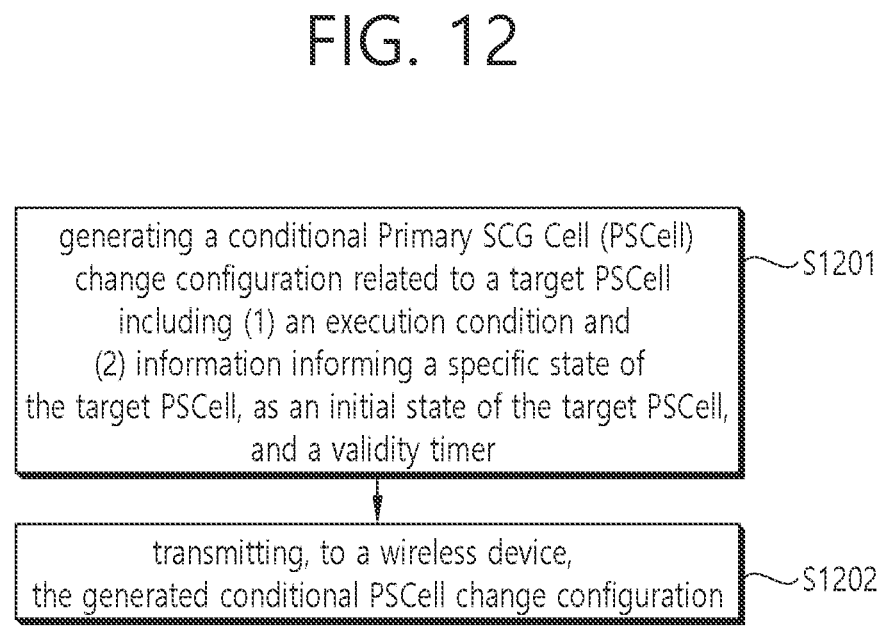

FIG. 12 generating a conditional Primary SCG Cell (PSCell)
change configuration related to a target PSCell
including (1) an execution condition and
(2) information informing a specific state of
the target PSCell, as an initial state of the target PSCell,
and a validity timer ~S1201 transmitting, to a wireless device,
the generated conditional PSCell change configuration ~S1202

METHOD AND APPARATUS FOR DETERMINING AN INITIAL STATE OF A SECONDARY CELL GROUP IN A WIRELESS COMMUNICATION SYSTEM

CROSS-REFERENCE TO RELATED APPLICATIONS

This application is a National Stage application under 35 U.S.C. § 371 of International Application No. PCT/KR2022/095096, filed on May 9, 2022, which claims the benefit of Korean Patent Application No. 10-2021-0061442, filed on May 12, 2021. The disclosures of the prior applications are hereby incorporated by reference in their entirety.

TECHNICAL FIELD

The present disclosure relates to a method and apparatus for determining an initial state of a Secondary Cell Group in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

The initial state of the Secondary Cell Group (SCG) (that is, the initial state of the Primary SCG Cell (PSCell)) can be explicitly configured by a network to be either activated or deactivated, when PSCell is changed.

However, it may not be suitable in some cases. For example, when the conditional reconfiguration is used to change the PSCell (that is, conditional PSCell change (CPC)), the network does not know when the UE will perform the conditional reconfiguration execution, because the conditional reconfiguration execution is triggered by the UE based on the UE measurement results.

Thus, if the initial state of the new PSCell is explicitly configured by the network, there may be a mismatch between the current status of data transmission on SCG and the configured initial state of the new PSCell. For example, when there is on-going data on SCG which means that the current PSCell is in an activated state, the configured initial state of the new PSCell may be a deactivated state, which is not desirable.

Therefore, studies for handling determining an initial state of an SCG in a wireless communication system are required.

In an aspect, a method performed by a wireless device in a wireless communication system is provided. A wireless device receives, from a network, a conditional Primary SCG Cell (PSCell) change configuration related to a target PSCell including (1) an execution condition and (2) information informing a specific state of the target PSCell, as an initial state of the target PSCell, and a validity timer. A wireless device performs conditional PSCell change procedure from a current PSCell to the target PSCell based on determining that the execution condition is met. The conditional PSCell change procedure includes determining the initial state of the target PSCell. The initial state of the target PSCell is determined as the specific state, while the validity timer is running. The initial state of the target PSCell is determined same as a current state of the current PSCell, after the validity timer expires.

In another aspect, an apparatus for implementing the above method is provided.

The present disclosure can have various advantageous effects.

According to some embodiments of the present disclosure, a wireless device could determine initial state of a Secondary Cell Group (SCG) efficiently. For example, a wireless device could perform PSCell change efficiently by determining the initial state of the PSCell.

In other words, when a wireless device performs conditional PSCell change, it is possible to efficiently set the initial state of the target PSCell.

For example, if PSCell change is executed when current PSCell is activated, the wireless device can keep transmitting/receiving data on SCG by activating the target PSCell upon PSCell change by following the current status of the current PSCell. In addition, if PSCell change is executed when current PSCell is deactivated, the wireless device can save its power by deactivating the target PSCell upon PSCell change by following the current status of the current PSCell.

Furthermore, the wireless device could determine the initial state of the SCG more efficiently, based on a validity timer for the indicated initial state from the network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 3 shows an example of a wireless device to which implementations of the present disclosure is applied.

FIG. 10 shows an example of a method for determining an initial state of a Secondary Cell Group in a wireless communication system, according to some embodiments of the present disclosure.

FIG. 12 shows an example of Base Station (BS) operations for determining an initial state of a Secondary Cell Group in a wireless communication system, according to some embodiments of the present disclosure.

DETAILED DESCRIPTION

Figure 2:
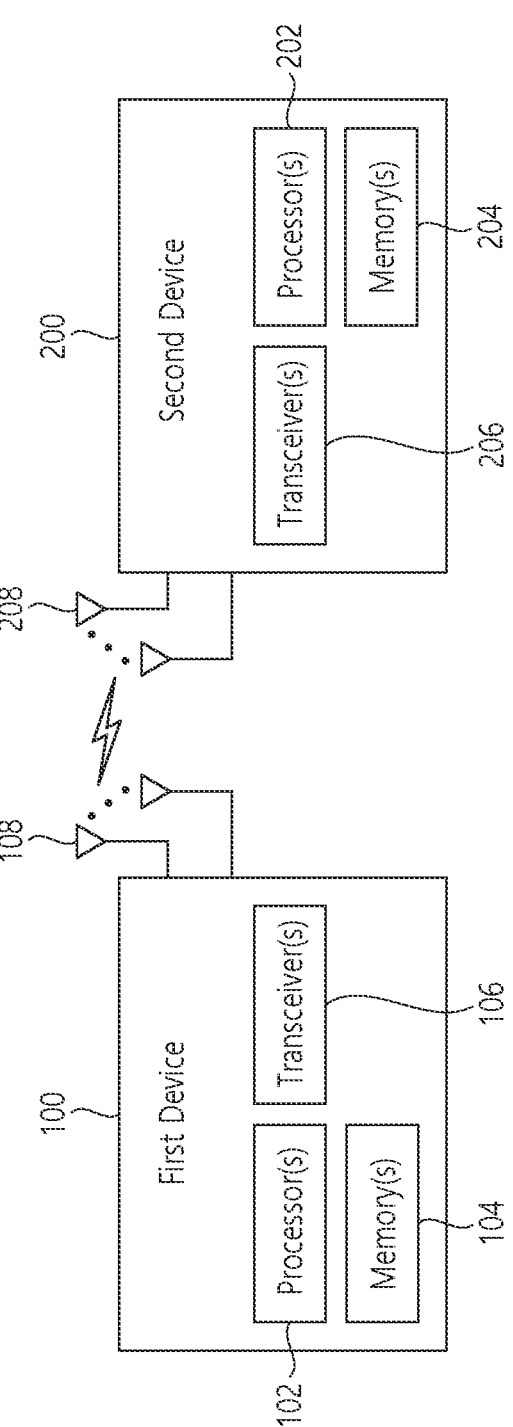
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B. C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
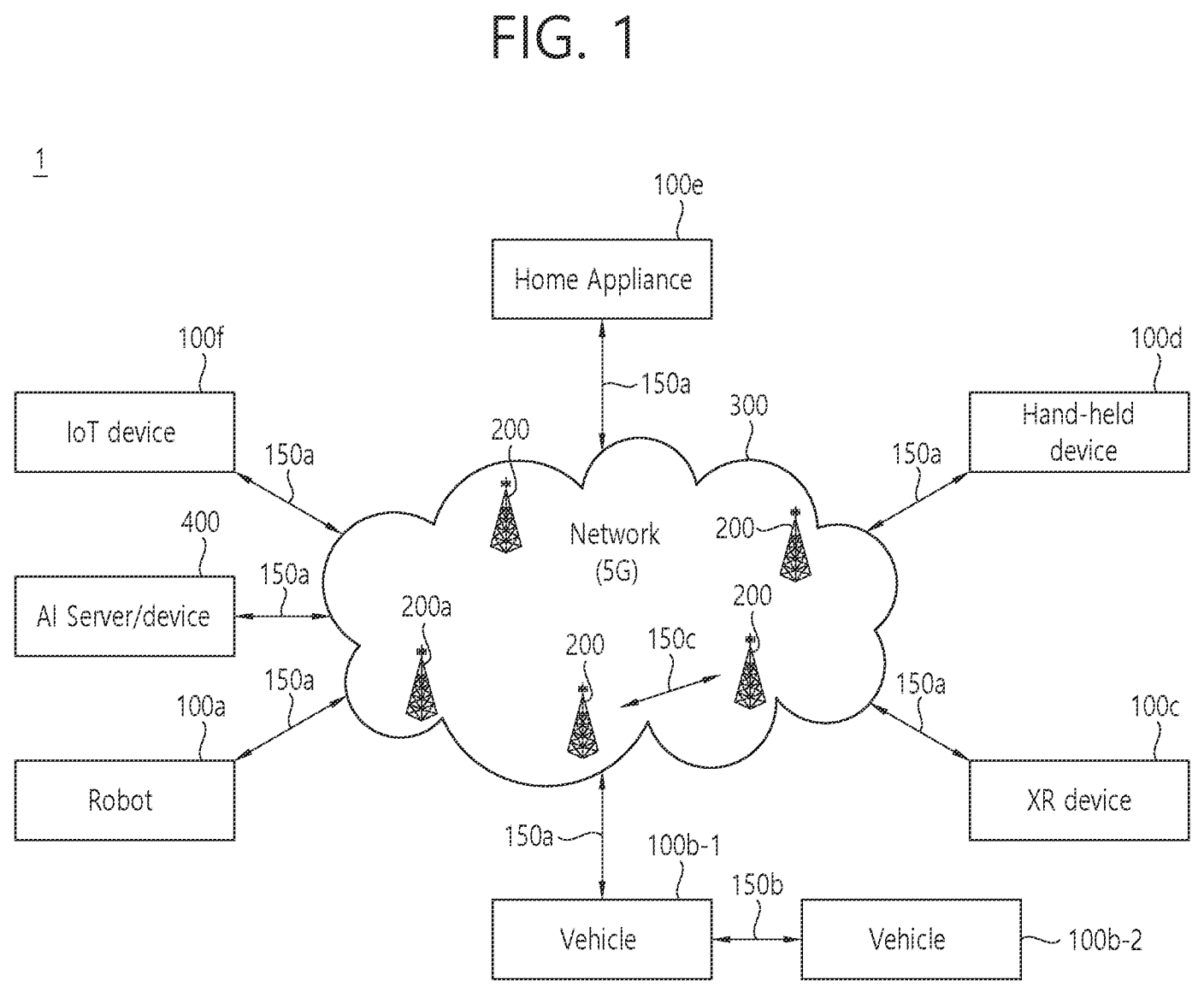

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used. 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a. 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example. ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}. {the wireless device 100a to 100f and the wireless device 100a to '} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
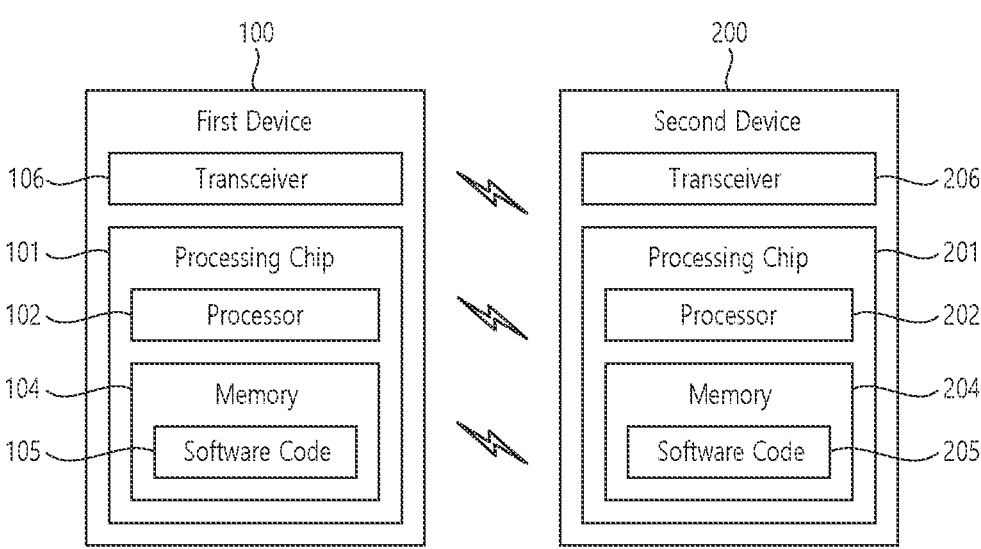
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
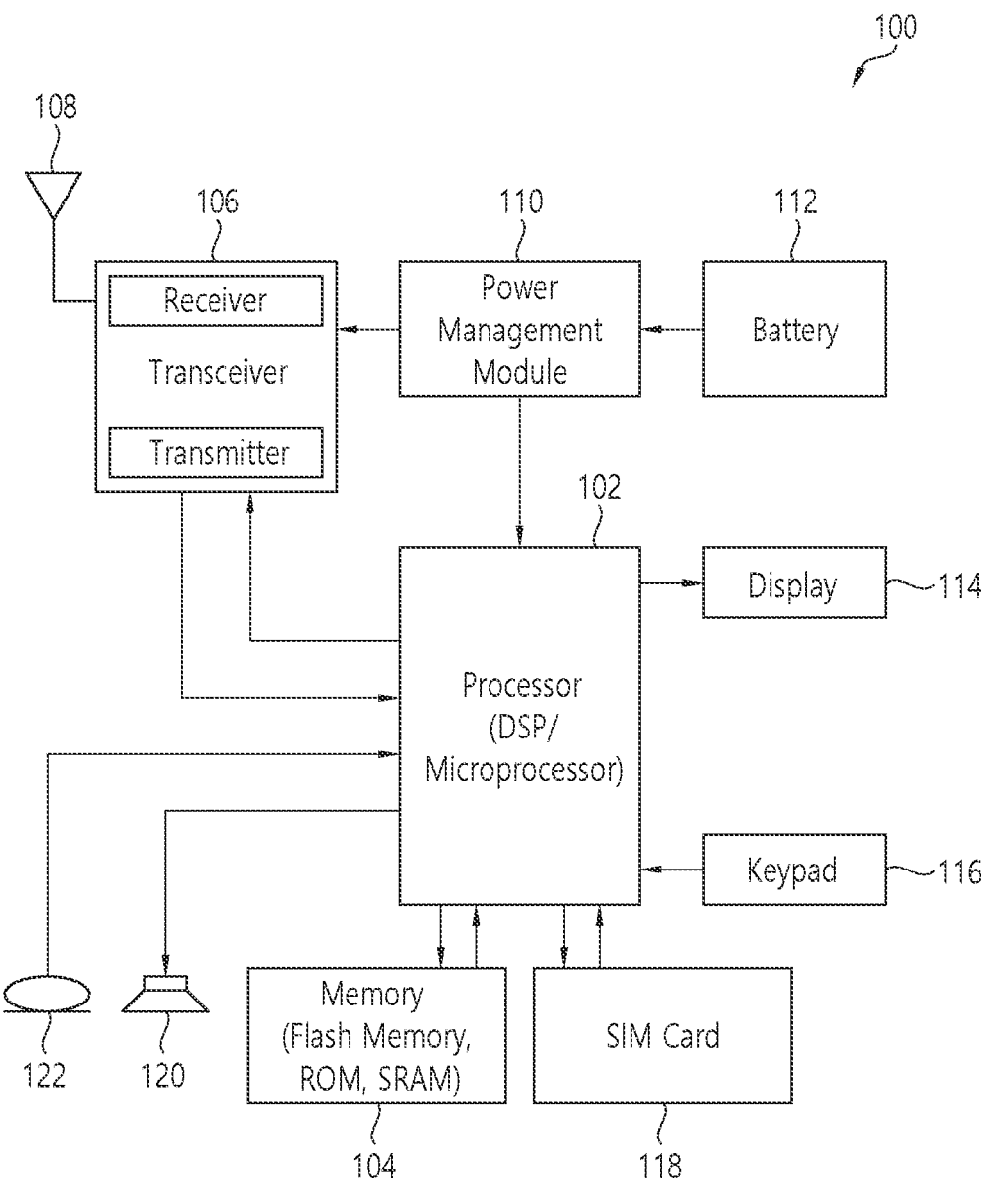
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm. EXYNOS™ series of processors made by Samsung®, A series of processors made by Apple®, HELIO™ series of processors made by MediaTek® ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
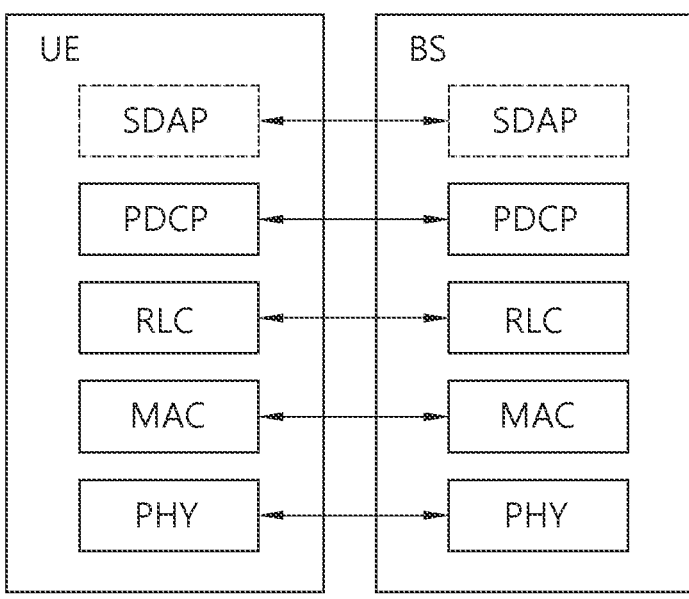
FIGS. 6 and 7 show an example of protocol stacks in a 3GPP based wireless communication system to which implementations of the present disclosure is applied.
Figure 7:
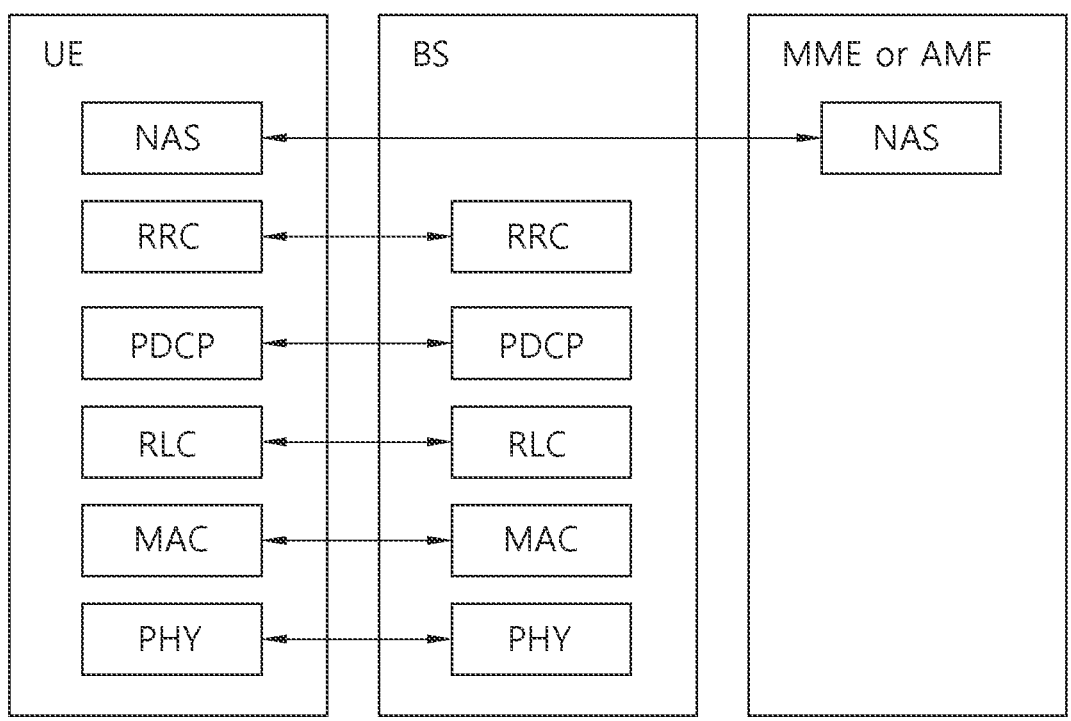

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC. PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
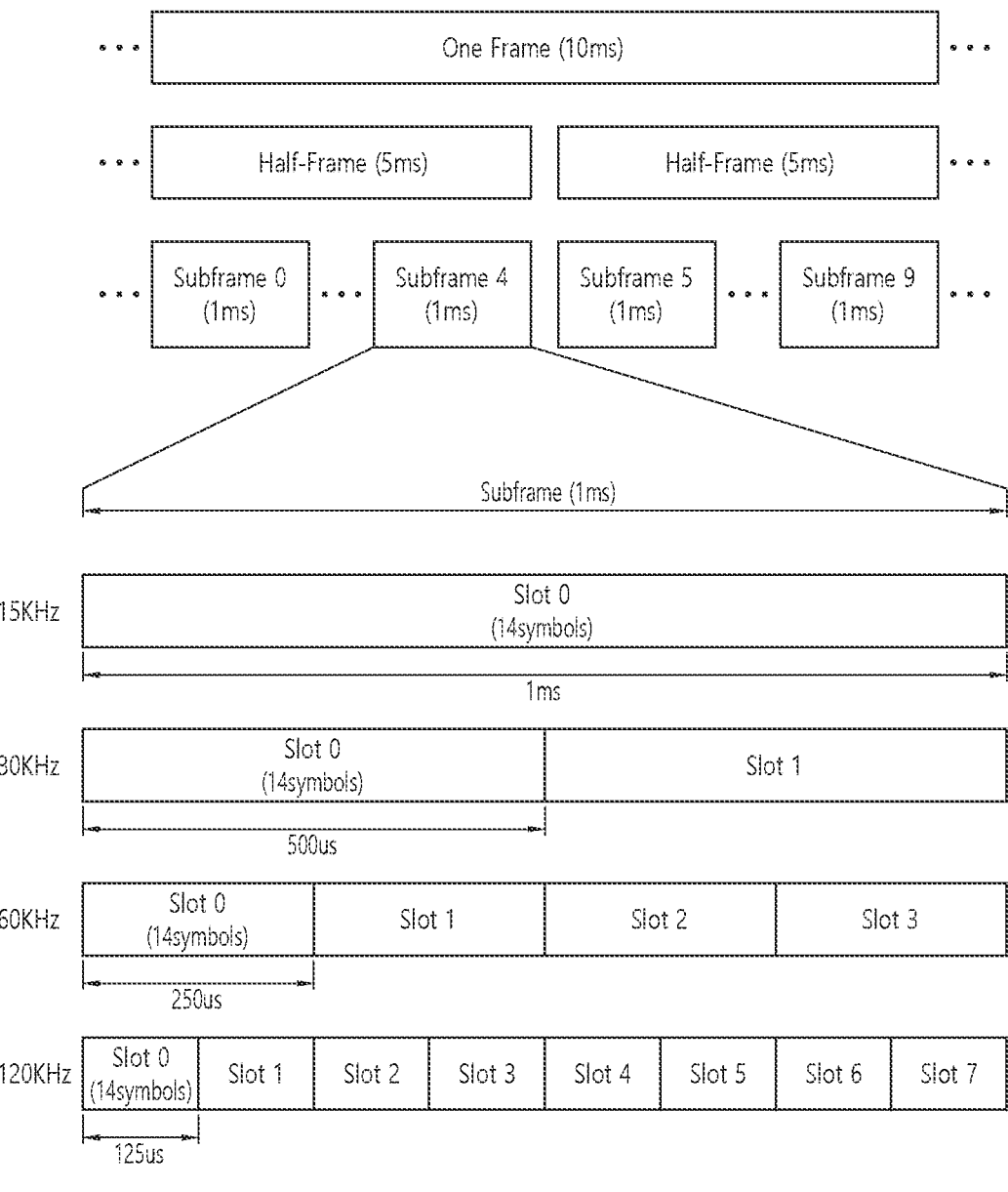
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ KHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ KHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ KHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{start,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHZ (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
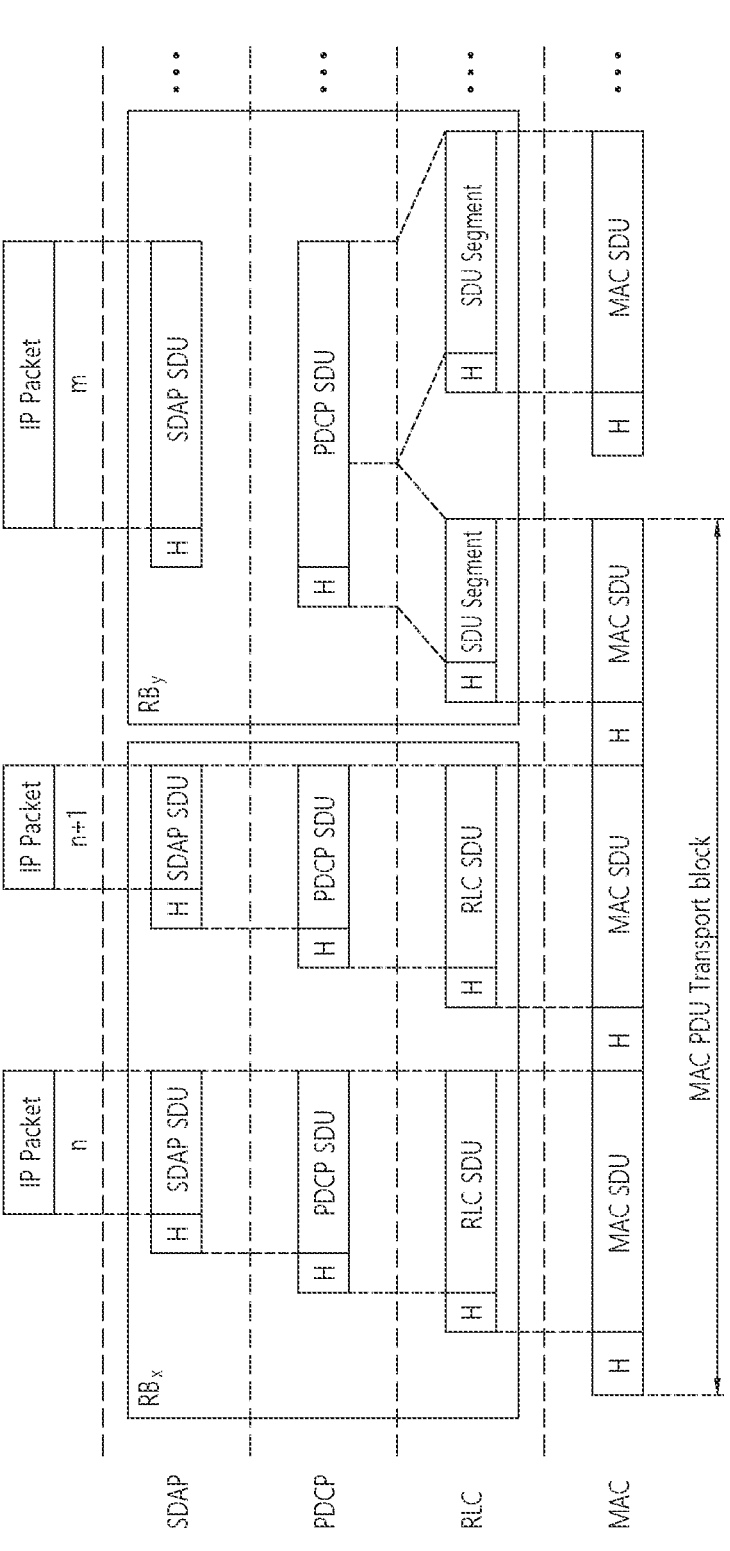
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, Activation or Deactivation Mechanism is described. Section 10 of 3GPP TS 38.300 v16.3.0 may be referred.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform CQI measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated. SCells of secondary PUCCH group (a group of SCells whose PUCCH signalling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells:

SCells added to the set are initially activated or deactivated;

SCells which remain in the set (either unchanged or reconfigured) do not change their activation status (activated or deactivated).

At handover or connection resume from RRC_INAC-TIVE:

SCells are activated or deactivated.

To enable reasonable UE battery consumption when BA is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, PRACH and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI mea-surements, AGC and beam management, if configured. A DCI is used to control entering/leaving the dormant BWP for one or more SCell(s) or one or more SCell group(s).

The dormant BWP is one of the UE's dedicated BWPs configured by a network via dedicated RRC signalling. The SpCell and PUCCH SCell cannot be configured with a dormant BWP.

Hereinafter, technical features related to PSCell change are described. Section 10.6 of 3GPP TS 37.340 v16.3.0 may be referred.

In MR-DC, a PSCell change does not always require a security key change.

If a security key change is required, this is performed through a synchronous SCG reconfiguration procedure towards the UE involving random access on PSCell and a security key change, during which the MAC entity config-ured for SCG is reset and RLC configured for SCG is re-established regardless of the bearer type(s) established on SCG. For SN terminated bearers. PDCP is re-established. In all MR-DC options, to perform this procedure within the same SN, the SN Modification procedure is used, setting the PDCP Change Indication to indicate that a S-KgNB (for EN-DC, NGEN-DC and NR-DC) or S-K$_{eNB}$ (for NE-DC) update is required when the procedure is initiated by the SN or including the SgNB Security Key/SN Security Key when the procedure is initiated by the MN. In all MR-DC options, to perform a PSCell change between different SN nodes, the SN Change procedure as described in clause 10.5 is used.

If a security key change is not required (only possible in EN-DC, NGEN-DC and NR-DC), this is performed through a synchronous SCG reconfiguration procedure without secu-rity key change towards the UE involving random access on PSCell, during which the MAC entity configured for SCG is reset and RLC configured for SCG is re-established regard-less of the bearer type(s) established on SCG. For bearers using RLC AM mode PDCP data recovery applies, for bearers using RLC UM no action is performed in PDCP while for SRBs PDCP discards all stored SDUs and PDUs. Unless MN terminated SCG or split bearers are configured, this does not require MN involvement. In this case, if location information was requested for the UE, the SN informs the MN about the PSCell change (as part of location information) using the SN initiated SN modification proce-dure independently from the reconfiguration of the UE. In case of MN terminated SCG or split bearers, the SN initiated SN Modification procedure is used, setting the PDCP Change Indication to indicate that a PDCP data recovery is required.

A Conditional PSCell Change (CPC) is defined as a PSCell change that is executed by the UE when execution condition(s) is met. The UE starts evaluating the execution condition(s) upon receiving the CPC configuration, and stops evaluating the execution condition(s) once PSCell change is triggered. Only intra-SN CPC is supported.

The following principles apply to CPC:

The CPC configuration contains the configuration of CPC candidate PSCell(s) and execution condition(s) gener-ated by the SN.

An execution condition may consist of one or two trigger condition(s) (CPC events A3/A5). Only single RS type is supported and at most two different trigger quantities (e.g. RSRP and RSRQ, RSRP and SINR, etc.) can be configured simultaneously for the evaluation of CPC execution condition of a single candidate PSCell.

Before any CPC execution condition is satisfied, upon reception of PSCell change command or PCell change command, the UE executes the PSCell change proce-dure or the PCell change procedure, regardless of any previously received CPC configuration. Upon the suc-cessful completion of PSCell change procedure or PCell change procedure, the UE releases all stored CPC configurations.

While executing CPC, the UE is not required to continue evaluating the execution condition of other candidate PSCell(s).

Once the CPC procedure is executed successfully, the UE releases all stored CPC configurations.

Upon the release of SCG, the UE releases the stored CPC configurations.

CPC configuration in HO command, PSCell change com-mand or CPC configuration is not supported.

Technical features related to Activation/Deactivation of SCells are described. Section 5.9 of 3GPP TS 38.321 v16.2.1 may be referred.

If the MAC entity is configured with one or more SCells, the network may activate and deactivate the configured SCells. Upon configuration of an SCell, the SCell is deac-tivated unless the parameter sCellState is set to activated for the SCell by upper layers.

The configured SCell(s) is activated and deactivated by:
receiving the SCell Activation/Deactivation MAC CE;
configuring sCellDeactivationTimer timer per configured SCell (except the SCell configured with PUCCH, if any): the associated SCell is deactivated upon its expiry;
configuring sCellState per configured SCell: if config-ured, the associated SCell is activated upon SCell configuration.

The MAC entity shall for each configured SCell:
1> if an SCell is configured with sCellState set to acti-vated upon SCell configuration, or an SCell Activation/ Deactivation MAC CE is received activating the SCell:
2> if the SCell was deactivated prior to receiving this SCell Activation/Deactivation MAC CE; or
2> if the SCell is configured with sCellState set to activated upon SCell configuration:
3> if firstActiveDownlinkBWP-Id is not set to dormant BWP:
4> activate the SCell according to the timing; i.e. apply normal SCell operation including:
5> SRS transmissions on the SCell;
5> CSI reporting for the SCell;
5> PDCCH monitoring on the SCell;
5> PDCCH monitoring for the SCell;
5> PUCCH transmissions on the SCell, if configured.
3> else (i.e. firstActiveDownlinkBWP-Id is set to dor-mant BWP):
4> stop the bwp-InactivityTimer of this Serving Cell, if running.

3> activate the DL BWP and UL BWP indicated by firstActiveDownlinkBWP-Id and firstActiveU-plinkBWP-Id respectively.

2> start or restart the sCellDeactivationTimer associated with the SCell according to the timing;

2> if the active DL BWP is not the dormant BWP:

3> (re-)initialize any suspended configured uplink grants of configured grant Type 1 associated with this SCell according to the stored configuration, if any, and to start in the symbol;

3> trigger PHR.

1> else if an SCell Activation/Deactivation MAC CE is received deactivating the SCell; or 1> if the sCellDeactivationTimer associated with the activated SCell expires:

2> deactivate the SCell;

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell;

2> cancel, if any, triggered consistent LBT failure for the SCell.

1> if PDCCH on the activated SCell indicates an uplink grant or downlink assignment; or 1> if PDCCH on the Serving Cell scheduling the activated SCell indicates an uplink grant or a downlink assign-ment for the activated SCell; or 1> if a MAC PDU is transmitted in a configured uplink grant and LBT failure indication is not received from lower layers; or 1> if a MAC PDU is received in a configured downlink assignment:

2> restart the sCellDeactivationTimer associated with the SCell.

1> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation.

When SCell is deactivated, the ongoing Random Access procedure on the SCell, if any, is aborted.

Hereinafter, terms used for the present disclosure are described. Section 3.1 of 3GPP TS 38.331 v16.2.0 may be referred.

Primary Cell: The MCG cell, operating on the primary frequency, in which the UE either performs the initial connection establishment procedure or initiates the connec-tion re-establishment procedure.

Primary SCG Cell: For dual connectivity operation, the SCG cell in which the UE performs random access when performing the Reconfiguration with Sync procedure.

Secondary Cell: For a UE configured with CA, a cell providing additional radio resources on top of Special Cell.

Secondary Cell Group: For a UE configured with dual connectivity, the subset of serving cells comprising of the PSCell and zero or more secondary cells.

Serving Cell: For a UE in RRC_CONNECTED not configured with CA/DC there is only one serving cell comprising of the primary cell. For a UE in RRC_CON-NECTED configured with CA/DC the term 'serving cells' is used to denote the set of cells comprising of the Special Cell(s) and all secondary cells.

Special Cell: For Dual Connectivity operation the term Special Cell refers to the PCell of the MCG or the PSCell of the SCG, otherwise the term Special Cell refers to the PCell.

Hereinafter, technical features related to Cell Group con-figuration are described. Section 5.3.5 of 3GPP TS 38.331 v16.2.0 may be referred.

SpCell Configuration is described.

The UE shall:

1> if the SpCellConfig contains the rlf-TimersAndCon-stants:

2> configure the RLF timers and constants for this cell group;

1> else if rlf-TimersAndConstants is not configured for this cell group:

2> if any DAPS bearer is configured:

3> use values for timers T301, T310, T311 and constants N310, N311 for the target cell group, as included in ue-TimersAndConstants received in SIB1;

2> else

3> use values for timers T301, T310, T311 and constants N310, N311, as included in ue-TimersAndConstants received in SIB1;

1> if the SpCellConfig contains spCellConfigDedicated;

2> configure the SpCell in accordance with the spCell-ConfigDedicated;

2> consider the bandwidth part indicated in firstActiveU-plinkBWP-Id if configured to be the active uplink bandwidth part;

2> consider the bandwidth part indicated in firstActive-DownlinkBWP-Id if configured to be the active down-link bandwidth part;

2> if any of the reference signal(s) that are used for radio link monitoring are reconfigured by the received spCellConfigDedicated:

3> stop timer T310 for the corresponding SpCell, if running;

3> stop timer T312 for the corresponding SpCell, if running;

3> reset the counters N310 and N311.

Conditional Reconfiguration is described.

The network configures the UE with one or more candi-date target SpCells in the conditional reconfiguration. The UE evaluates the condition of each configured candidate target SpCell. The UE applies the conditional reconfigura-tion associated with one of the target SpCells which fulfils associated execution condition. The network provides the configuration parameters for the target SpCell in the Con-ditionalReconfiguration IE.

The UE performs the following actions based on a received ConditionalReconfiguration IE:

1> if the ConditionalReconfiguration contains the con-dReconfigToRemoveList:

2> perform conditional reconfiguration removal proce-dure;

1> if the ConditionalReconfiguration contains the con-dReconfigToAddModList:

2> perform conditional reconfiguration addition/modifi-
cation;

Conditional reconfiguration removal is described.

The UE shall:

1> for each condReconfigId value included in the con-
dReconfigToRemoveList that is part of the current UE
conditional reconfiguration in VarConditionalReconfig:

2> remove the entry with the matching condReconfigId
from the VarConditionalReconfig:

The UE does not consider the message as erroneous if the
condReconfigToRemoveList includes any condReconfigId
value that is not part of the current UE configuration.

Conditional reconfiguration addition/modification is
described.

For each condReconfigId received in the condReconfig-
ToAddModList IE the UE shall:

1> if an entry with the matching condReconfigId exists in
the condReconfigToAddModList within the VarCondi-
tionalReconfig:

2> if the entry in condReconfigToAddModList includes
an condExecutionCond;

3> replace the entry with the value received for this
condReconfigId;

2> if the entry in condReconfigToAddModList includes
an condRRCReconfig;

2> replace the entry with the value received for this
condReconfigId;

1> else:

2> add a new entry for this condReconfigId within the
VarConditionalReconfig;

1> perform conditional reconfiguration evaluation;

Conditional reconfiguration evaluation is described.

The UE shall:

1> for each condReconfigId within the VarConditional-
Reconfig:

2> consider the cell which has a physical cell identity
matching the value indicated in the ServingCellCon-
figCommon included in the reconfigurationWithSync
in the received condRRCReconfig to be applicable cell;

2> for each measId included in the measIdList within
VarMeasConfig indicated in the condExecutionCond
associated to condReconfigId:

3> if the entry condition(s) applicable for this event
associated with the condReconfigId, i.e. the event cor-
responding with the condEventId(s) of the correspond-
ing condTriggerConfig within VarConditionalRecon-
fig, is fulfilled for the applicable cells for all
measurements after layer 3 filtering taken during the
corresponding timeToTrigger defined for this event
within the VarConditionalReconfig:

4> consider the event associated to that measId to be
fulfilled;

3> if the leaving condition(s) applicable for this event
associated with the condReconfigId, i.e. the event cor-
responding with the condEventId(s) of the correspond-
ing condTriggerConfig within VarConditionalRecon-
fig, is fulfilled for the applicable cells for all
measurements after layer 3 filtering taken during the
corresponding timeToTrigger defined for this event
within the VarConditionalReconfig:

4> consider the event associated to that measId to be not
fulfilled;

2> if event(s) associated to all measId(s) within condTrig-
gerConfig for a target candidate cell within the stored
condRRCReconfig are fulfilled:

3> consider the target candidate cell within the stored
condRRCReconfig, associated to that condReconfigId,
as a triggered cell;

3> initiate the conditional reconfiguration execution;

Up to 2 MeasId can be configured for each condRecon-
figId. The conditional reconfiguration event of the 2 MeasId
may have the same or different event conditions, triggering
quantity, time to trigger, and triggering threshold.

Conditional reconfiguration execution is described.

The UE shall:

1> if more than one triggered cell exists:

2> select one of the triggered cells as the selected cell for
conditional reconfiguration execution;

1> for the selected cell of conditional reconfiguration
execution:

2> apply the stored condRRCReconfig of the selected
cell;

If multiple NR cells are triggered in conditional recon-
figuration execution, it is up to UE implementation which
one to select, e.g. the UE considers beams and beam quality
to select one of the triggered cells for execution.

Meanwhile, the initial state of the Secondary Cell Group
(SCG) (that is, the initial state of the Primary SCG Cell
(PSCell)) can be explicitly configured by a network to be
either activated or deactivated, when PSCell is changed.

However, it may not be suitable in some cases. For
example, when the conditional reconfiguration is used to
change the PSCell (that is, conditional PSCell change
(CPC)), the network doesn't know when the UE will per-
form the conditional reconfiguration execution, because the
conditional reconfiguration execution is triggered by the UE
based on the UE measurement results.

For example, if conditional reconfiguration for PSCell
change is executed when the current PSCell is activated,
then it may be desirable that the initial state of the new
PSCell is set to be an activated state in order to receive/
transmit on-going data on SCG. On the contrary, if the
conditional reconfiguration for PSCell change is executed
when the current PSCell is deactivated, this means that there
is no on-going data on SCG. In this case, it may be desirable
that the initial state of the new PSCell is set to be a
deactivated state.

Thus, if the initial state of the new PSCell is explicitly
configured by the network, there may be a mismatch
between the current status of data transmission on SCG and
the configured initial state of the new PSCell. For example,
when there is on-going data on SCG which means that the
current PSCell is in an activated state, the configured initial
state of the new PSCell may be a deactivated state, which is
not desirable.

Therefore, studies for handling determining an initial state
of a Secondary Cell Group (SCG) in a wireless communi-
cation system are required.

Hereinafter, a method for determining an initial state of a
Secondary Cell Group in a wireless communication system,
according to some embodiments of the present disclosure,
will be described with reference to the following drawings.

The following drawings are created to explain specific
embodiments of the present disclosure. The names of the
specific devices or the names of the specific signals/mes-
sages/fields shown in the drawings are provided by way of
example, and thus the technical features of the present
disclosure are not limited to the specific names used in the
following drawings. Herein, a wireless device may be
referred to as a user equipment (UE).

FIG. 10 shows an example of a method for determining an initial state of a Secondary Cell Group in a wireless communication system, according to some embodiments of the present disclosure.

In particular, FIG. 10 shows an example of a method performed by a wireless device in a wireless communication system.

In step S1001, a wireless device may receive, from a network, a conditional Primary SCG Cell (PSCell) change configuration related to a target PSCell including (1) an execution condition and (2) information informing a specific state of the target PSCell, as an initial state of the target PSCell, and a validity timer.

For example, the conditional PSCell change configuration may be signalled via a Radio Resource Control (RRC) message. For example, the RRC message may be an RRC re-configuration message.

For example, the initial state of the target PSCell may be either an activated state or a deactivated state. The current state of the current PSCell may be either an activated state or a deactivated state.

According to some embodiments of the present disclosure, the wireless device may start the validity timer upon receiving the conditional PSCell change configuration.

For another example, the conditional Primary SCG Cell (PSCell) change configuration may include information on validity time (that is, a certain time period) for the specific state of the target PSCell. In this case, the wireless device may consider that the specific state of the target PSCell is valid only for the validity time period.

According to some embodiments of the present disclosure, the wireless device may evaluate the execution condition related to the target PSCell. That is, the wireless device may perform measurements on the target PSCell and evaluate whether the measurement results of the target PSCell is satisfied the execution condition or not.

In step S1002, a wireless device may perform a conditional PSCell change procedure from a current PSCell to the target PSCell based on determining that the execution condition is met.

The conditional PSCell change procedure may include determining the initial state of the target PSCell.

For example, the initial state of the target PSCell may be determined as the specific state, while the validity timer is running.

For example, the initial state of the target PSCell may be determined same as a current state of the current PSCell, after the validity timer expires.

For example, the wireless device may consider that state of all serving cells which belong to a Secondary Cell Group (SCG), where the target PSCell belongs, as an activated state, based on that state of the target PSCell is determined as an activated state.

For another example, the wireless device may consider that state of all serving cells which belong to an SCG, where the target PSCell belongs, as a deactivated state, based on that state of the target PSCell is determined as a deactivated state.

For example, the wireless device may transmit and/or receive data via the target PSCell without an activation command for the target PSCell, based on that the initial state of the target PSCell is determined as an activated state.

For example, the wireless device may transmit and/or receive data via the target PSCell after receiving an activation command for the target PSCell, based on that the initial state of the target PSCell is determined as a deactivated state.

According to some embodiments of the present disclosure, the conditional PSCell change configuration may further include information informing whether the target PSCell supports a de-activated state. In this case, the initial state of the target PSCell may be determined as an activated state, based on the target BS cell does not support a de-activated state. That is, when the conditional PSCell change configuration includes the information informing that the target PSCell does not support the de-activated state, the wireless device may consider the initial state of the target PSCell as an activated state.

According to some embodiments of the present disclosure, the wireless device may be in communication with at least one of a user equipment, a network, or an autonomous vehicle other than the wireless device.

Hereinafter, examples of methods for handling an initial state of a PSCell in a wireless communication system will be described.

According to some embodiments of the present disclosure, when PSCell is changed for a UE, the UE may determine the initial state of a new PSCell, based on (1) whether the initial state of the new PSCell is configured or not in the received configuration for the new PSCell and (2) the state of the current PSCell.

For example, the configuration for the new PSCell may include an indication indicating that an initial state of the new PSCell is set to either an activated state or a deactivated state.

For example, the state of the current PSCell is either an activated state or a deactivated state.

According to some embodiments of the present disclosure, if the initial state of the new PSCell is not configured in the received configuration for the new PSCell, a UE may consider the initial state of the new PSCell is current state of the current PSCell. That is, the initial state of the new PSCell may follow the current state of the current PSCell.

For example, if the initial state of the new PSCell is not configured in the received configuration for the new PSCell, and if the current state of the current PSCell is an activated state, the UE may consider the initial state of the new PSCell is the activated state. If the initial state of the new PSCell is not configured in the received configuration for the new PSCell, and if the current state of the current PSCell is a deactivated state, the UE may consider the initial state of the new PSCell is the deactivated state.

According to some embodiments of the present disclosure, if the initial state of the new PSCell is configured in the received configuration for the new PSCell, a UE may determine the initial state of the new PSCell according to the indication included in the received configuration for the new PSCell.

For example, if the initial state of the new PSCell is set to an activated state in the configuration for the new PSCell, the UE may consider the initial state of the new PSCell is the activated state. If the initial state of the new PSCell is set to a deactivated state in the configuration for the new PSCell, the UE may consider the initial state of the new PSCell is the deactivated state.

For example, the configuration for the new PSCell can be signalled via RRC layer (for example, via an RRC re-configuration message).

For example, if a UE determines that the initial state of the PSCell is an activated state, the UE may consider the state of all serving cells which belong to the SCG are activated state.

For example, if a UE determines that the initial state of the PSCell is a deactivated state, the UE may consider the state of one or more serving cells which belong to the SCG are deactivated state.

For example, if a UE determines that the initial state of the PSCell is an activated state, the UE can transmit or receive data on the new PSCell without receiving any activation command for the new PSCell.

For example, after UE determines that the initial state of the PSCell is a deactivated state, the UE may activate the new PSCell upon receiving an activation command for the new PSCell from the network. Then, the UE may transmit or receive data on the new PSCell.

According to some embodiments of the present disclosure, a UE may determine the initial state of the new PSCell upon receiving the configuration for the new PSCell from a network, if the configuration for the new PSCell is not conditional reconfiguration.

For example, a UE may determine the initial state of the new PSCell, when the reconfiguration condition is met, and if the configuration for the new PSCell is conditional reconfiguration.

For example, if the configuration for the new PSCell is conditional reconfiguration, the UE may apply the configuration for the new PSCell (that is, the UE may change the PSCell to the new PSCell), when a condition configured in the conditional reconfiguration is met. According to some embodiments of the present disclosure, if the configuration for the new PSCell is conditional reconfiguration, and if the current state of the current PSCell is an activated state, the UE may consider the initial state of the new PSCell is an activated state.

Otherwise, if the configuration for the new PSCell is conditional reconfiguration, and if the current state of the current PSCell is a deactivated state, the UE may consider the initial state of the new PSCell is a deactivated state.

According to some embodiments of the present disclosure, in the conditional PSCell change configuration, the initial activation state (that is, activated state or de-activated state) can be indicated with a validity timer. Upon receiving the conditional PSCell change configuration including the validity timer, the UE may start the validity timer.

For example, while the timer is running, if the conditional PSCell change is executed (that is, if the execution condition is met), the UE may apply the initial activation state indicated in the received conditional PSCell change configuration to the new PSCell (that is, target PSCell).

For example, if the conditional PSCell change is executed after the validity timer expires (that is, if the execution condition is met while the validity timer is not running), the UE may not apply the initial activation state indicated in the received conditional PSCell change configuration to the target PSCell. In this case, the UE may consider the initial activation state of the target PSCell is same as the activation state of the source PSCell when the execution condition is met.

For another example, if the conditional PSCell change is executed after the validity timer expires (that is, if the execution condition is met while the validity timer is not running), the UE may consider the initial activation state of the target PSCell is 'activated'.

In other words, for example, if the activation state of the source PSCell is 'activated' when the execution condition is met, and if the validity timer is not running, the UE may consider the initial activation state of the target PSCell is 'activated'. If the activation state of the source PSCell is 'de-activated' when the execution condition is met, and if the validity timer is not running, the UE may consider the initial activation state of the target PSCell is 'de-activated'.

For example, if the validity timer is not configured in the conditional PSCell change configuration, the UE may consider the initial activation state of the target PSCell is 'activated', regardless of the activation state of the source PSCell.

According to some embodiments of the present disclosure, a UE may receive, from a network, a PSCell change command including (i) an execution condition, (ii) an indication indicating the initial activation state of the target PSCell, and (iii) a validity timer. The UE may start the validity timer.

For example, if the execution condition is met while the validity timer is running, the UE may apply the initial activation state indicated in the received PSCell change command to the target PSCell.

For other example, if the execution condition is met after the validity timer is expired, the UE may consider the initial state of the target PSCell same as the current state of the source PSCell.

For example, if the initial activation state of the new PSCell is 'de-activated', the UE may receive, from a network, an activation command for the new PSCell. Then, the UE may transmit and/or receive data using the new PSCell.

According to some embodiments of the present disclosure, the conditional PSCell change configuration may include an indication indicating whether or not the target PSCell supports the deactivated state.

For example, if the indication in the received conditional PSCell change configuration indicates that the target PSCell supports the deactivated state, a UE may determine the initial activation state of the target PSCell based on the last activation state of the source PSCell (that is, the activation state when the execution condition is met). For example, if the last activation state of the source PSCell is 'activated' and if the target PSCell supports the de-activated state, the UE may consider the initial activation state of the target PSCell is 'activated'. If the last activation state of the source PSCell is 'de-activated' and if the target PSCell supports the de-activated state, the UE may consider the initial activation state of the target PSCell is 'de-activated'.

For example, if the indication in the received conditional PSCell change configuration indicates that the target PSCell does not support the deactivated state, the UE may consider the initial activation state of the target PSCell is 'activated'.

According to some embodiments of the present disclosure, a UE may receive, from a network, a PSCell change command including an execution condition and an indication indicating whether the target PSCell supports the de-activated state. The UE may execute the PSCell change according to the received PSCell change command when the execution condition is met. The UE may determine the initial activation state of the target PSCell based on the last activation state of the source PSCell and the indication.

For example, if the initial activation state of the new PSCell is 'de-activated', the UE may receive, from a network, an activation command for the new PSCell. Then, the UE may transmit and/or receive data using the new PSCell.

Figure 11:
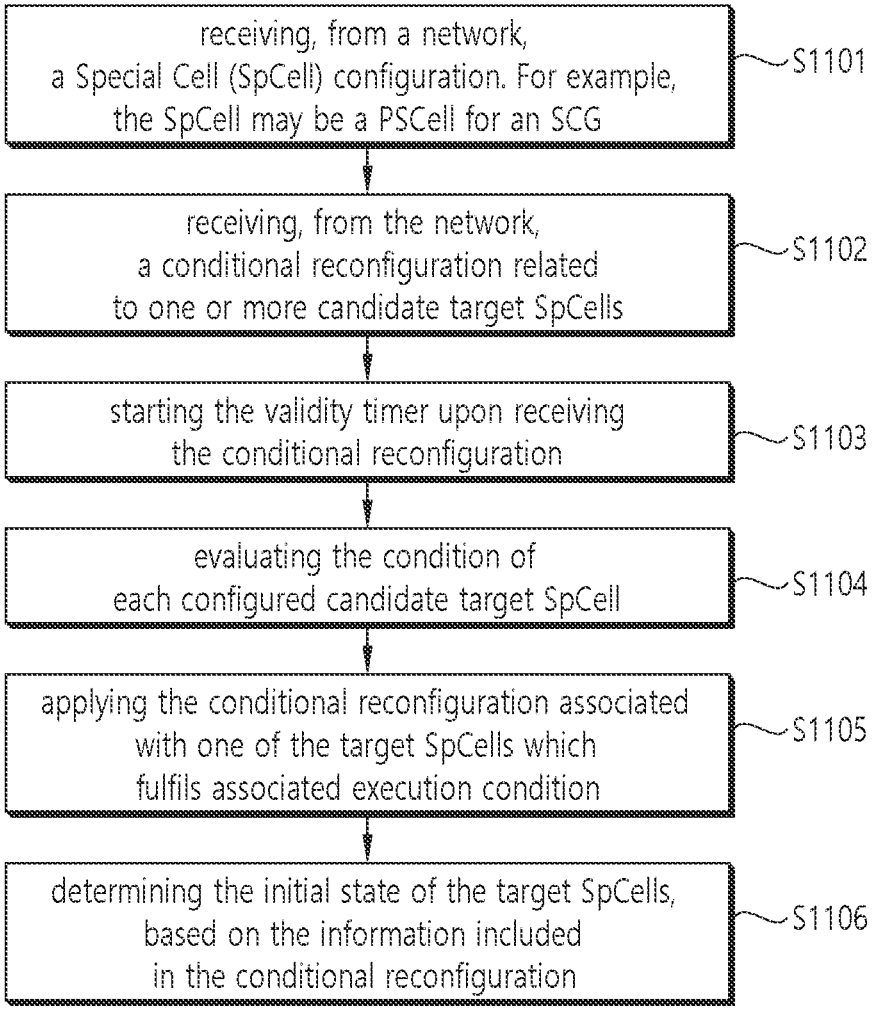
FIG. 11 shows an example of UE operations for determining an initial state of a Secondary Cell Group in a wireless communication system, according to some embodiments of the present disclosure.

FIG. 11 shows an example of UE operations for determining an initial state of a Secondary Cell Group in a wireless communication system, according to some embodiments of the present disclosure.

In step S1101, a UE may receive, from a network, a Special Cell (SpCell) configuration. For example, the SpCell may be a PSCell for an SCG.

For example, the UE may establish a connection with a SpCell based on the SpCell configuration. For example, the SpCell connected to the UE may be called as a current SpCell.

In step S1102, a UE may receive, from the network, a conditional reconfiguration related to one or more candidate target SpCells. For example, the candidate target SpCells may include a candidate target PSCell for the SCG.

For example, the conditional reconfiguration related to one or more candidate target SpCells may include (i) information on one or more execution conditions related to a specific candidate target SpCell. (ii) information on a specific initial state related to the specific candidate target SpCell, and (iii) information on a validity timer related to the specific initial state related to the specific candidate target SpCell.

In step S1103, a UE may start the validity timer upon receiving the conditional reconfiguration.

In step S1104, a UE may evaluate the condition of each configured candidate target SpCell.

For example, the UE may evaluate the one or more execution conditions related to the specific candidate target SpCell.

In step S1105, a UE may apply the conditional reconfiguration associated with one of the target SpCells which fulfils associated execution condition.

For example, the UE may select one of the triggered cells as the selected cell for conditional reconfiguration execution. For the selected cell of conditional reconfiguration execution, the UE may apply the stored conditional RRC Reconfiguration of the selected cell.

In step S1106, a UE may determine the initial state of the target SpCells, based on the information included in the conditional reconfiguration.

When the UE applies the conditional reconfiguration associated with the specific candidate target SpCell (that is, when the UE performs the conditional SpCell Change), the UE may determine the initial state of the specific candidate target SpCell based on (i) information on one or more execution conditions related to a specific candidate target SpCell, (ii) information on a specific initial state related to the specific candidate target SpCell, and (iii) information on a validity timer related to the specific initial state related to the specific candidate target SpCell.

For example, while the validity timer is running, the UE may consider the initial state of the specific candidate target SpCell as the specific initial state included in the conditional reconfiguration.

For other example, after the validity timer is expired, the UE may consider the initial state of the specific candidate target SpCell same as the initial state of the current SpCell.

FIG. 12 shows an example of Base Station (BS) operations for determining an initial state of a Secondary Cell Group in a wireless communication system, according to some embodiments of the present disclosure.

In step S1201, a BS may generate a conditional Primary SCG Cell (PSCell) change configuration related to a target PSCell including (1) an execution condition and (2) information informing a specific state of the target PSCell, as an initial state of the target PSCell, and a validity timer.

In step S1202, a BS may transmit, to a wireless device, the generated conditional PSCell change configuration.

Some of the detailed steps shown in the example of FIGS. 10, 11, and 12 may not be essential steps and may be omitted. In addition, steps other than the steps shown in FIGS. 10, 11, and 12 may be added, and the order of the steps may vary. Some of the above steps may have their own technical meaning.

Hereinafter, an apparatus for determining an initial state of a Secondary Cell Group in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, a conditional Primary SCG Cell (PSCell) change configuration related to a target PSCell including (1) an execution condition and (2) information informing a specific state of the target PSCell, as an initial state of the target PSCell, and a validity timer. The processor 102 may be configured to perform a conditional PSCell change procedure from a current PSCell to the target PSCell based on determining that the execution condition is met. The conditional PSCell change procedure may include determining the initial state of the target PSCell. The initial state of the target PSCell may be determined as the specific state, while the validity timer is running. The initial state of the target PSCell may be determined same as a current state of the current PSCell, after the validity timer expires.

For example, the conditional PSCell change configuration further may include information informing whether the target PSCell supports a de-activated state. In this case, the initial state of the target PSCell may be determined as an activated state, based on the target BS cell does not support a de-activated state.

For example, the processor 102 may be configured to start the validity timer upon receiving the conditional PSCell change configuration.

For example, the processor 102 may be configured to evaluate the execution condition related to the target PSCell.

For example, the conditional PSCell change configuration may be signalled via a Radio Resource Control (RRC) message. The RRC message may be an RRC re-configuration message.

For example, the initial state of the target PSCell may be either an activated state or a deactivated state. The current state of the current PSCell may be either an activated state or a deactivated state.

For example, the processor 102 may be configured to consider that state of all serving cells which belong to a Secondary Cell Group (SCG) where the target PSCell belongs, based on that the initial state of the target PSCell is determined as an activated state.

For example, the processor 102 may be configured to control the transceiver 106 to transmit and/or receive data via the target PSCell without an activation command for the target PSCell, based on that the initial state of the target PSCell is determined as an activated state.

For example, the processor 102 may be configured to control the transceiver 106 to transmit and/or receive data via the target PSCell after receiving an activation command for the target PSCell, based on that the initial state of the target PSCell is determined as a deactivated state.

According to some embodiments of the present disclosure, the processor 102 may be configured to be in communication with at least one of a user equipment, a network, or an autonomous vehicle other than the wireless device.

Hereinafter, a processor for a wireless device for determining an initial state of a Secondary Cell Group in a wireless communication system, according to some embodiments of the present disclosure, will be described.

The processor may be configured to control the wireless device to acquire, from a network, a conditional Primary SCG Cell (PSCell) change configuration related to a target PSCell including (1) an execution condition and (2) information informing a specific state of the target PSCell, as an initial state of the target PSCell, and a validity timer. The processor may be configured to control the wireless device to perform a conditional PSCell change procedure from a current PSCell to the target PSCell based on determining that the execution condition is met. The conditional PSCell change procedure may include determining the initial state of the target PSCell. The initial state of the target PSCell may be determined as the specific state, while the validity timer is running. The initial state of the target PSCell may be determined same as a current state of the current PSCell, after the validity timer expires.

For example, the conditional PSCell change configuration further may include information informing whether the target PSCell supports a de-activated state. In this case, the initial state of the target PSCell may be determined as an activated state, based on the target BS cell does not support a de-activated state.

For example, the processor may be configured to control the wireless device to start the validity timer upon receiving the conditional PSCell change configuration.

For example, the processor may be configured to control the wireless device to evaluate the execution condition related to the target PSCell.

For example, the conditional PSCell change configuration may be signalled via a Radio Resource Control (RRC) message. The RRC message may be an RRC re-configuration message.

For example, the initial state of the target PSCell may be either an activated state or a deactivated state. The current state of the current PSCell may be either an activated state or a deactivated state.

For example, the processor may be configured to control the wireless device to consider that state of all serving cells which belong to a Secondary Cell Group (SCG) where the target PSCell belongs, based on that the initial state of the target PSCell is determined as an activated state.

For example, the processor may be configured to control the wireless device to transmit and/or receive data via the target PSCell without an activation command for the target PSCell, based on that the initial state of the target PSCell is determined as an activated state.

For example, the processor may be configured to control the wireless device to transmit and/or receive data via the target PSCell after receiving an activation command for the target PSCell, based on that the initial state of the target PSCell is determined as a deactivated state.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for determining an initial state of a Secondary Cell Group in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM). FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to acquire, from a network, a conditional Primary SCG Cell (PSCell) change configuration related to a target PSCell including (1) an execution condition and (2) information informing a specific state of the target PSCell, as an initial state of the target PSCell, and a validity timer. The stored a plurality of instructions may cause the wireless device to perform a conditional PSCell change procedure from a current PSCell to the target PSCell based on determining that the execution condition is met. The conditional PSCell change procedure may include determining the initial state of the target PSCell. The initial state of the target PSCell may be determined as the specific state, while the validity timer is running. The initial state of the target PSCell may be determined same as a current state of the current PSCell, after the validity timer expires.

For example, the conditional PSCell change configuration further may include information informing whether the target PSCell supports a de-activated state. In this case, the initial state of the target PSCell may be determined as an activated state, based on the target BS cell does not support a de-activated state.

For example, the stored a plurality of instructions may cause the wireless device to start the validity timer upon receiving the conditional PSCell change configuration.

For example, the stored a plurality of instructions may cause the wireless device to evaluate the execution condition related to the target PSCell.

For example, the conditional PSCell change configuration may be signalled via a Radio Resource Control (RRC) message. The RRC message may be an RRC re-configuration message.

For example, the initial state of the target PSCell may be either an activated state or a deactivated state. The current state of the current PSCell may be either an activated state or a deactivated state.

For example, the stored a plurality of instructions may cause the wireless device to consider that state of all serving cells which belong to a Secondary Cell Group (SCG) where the target PSCell belongs, based on that the initial state of the target PSCell is determined as an activated state.

For example, the stored a plurality of instructions may cause the wireless device to transmit and/or receive data via the target PSCell without an activation command for the target PSCell, based on that the initial state of the target PSCell is determined as an activated state.

For example, the stored a plurality of instructions may cause the wireless device to transmit and/or receive data via the target PSCell after receiving an activation command for the target PSCell, based on that the initial state of the target PSCell is determined as a deactivated state.

According to some embodiments of the present disclosure, the stored a plurality of instructions may cause the wireless device to be in communication with at least one of a user equipment, a network, or an autonomous vehicle other than the wireless device.

Hereinafter, a base station (BS) for handling an initial state of a Secondary Cell Group in a wireless communication system, according to some embodiments of the present disclosure, will be described.

The BS may include a transceiver, a memory, and a processor operatively coupled to the transceiver and the memory.

The processor may be configured to generate a conditional Primary SCG Cell (PSCell) change configuration related to a target PSCell including (1) an execution condition and (2) information informing a specific state of the target PSCell, as an initial state of the target PSCell, and a validity timer. The processor may be configured to control the transceiver to transmit, to a wireless device, the generated conditional PSCell change configuration.

The present disclosure can have various advantageous effects.

According to some embodiments of the present disclosure, a wireless device could determine initial state of a Secondary Cell Group (SCG) efficiently. For example, a wireless device could perform PSCell change efficiently by determining the initial state of the PSCell.

In other words, when a wireless device performs conditional PSCell change, it is possible to efficiently set the initial state of the target PSCell.

For example, if PSCell change is executed when current PSCell is activated, the wireless device can keep transmitting/receiving data on SCG by activating the target PSCell upon PSCell change by following the current status of the current PSCell. In addition, if PSCell change is executed when current PSCell is deactivated, the wireless device can save its power by deactivating the target PSCell upon PSCell change by following the current status of the current PSCell.

Furthermore, the wireless device could determine the initial state of the SCG more efficiently, based on a validity timer for the indicated initial state from the network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method performed by a wireless device in a wireless communication system, the method comprising, receiving, from a network, a conditional Primary SCG Cell (PSCell) change configuration related to a target PSCell including (1) an execution condition and (2) information informing a specific state of the target PSCell, as an initial state of the target PSCell, and a validity timer; and performing conditional PSCell change procedure from a current PSCell to the target PSCell based on determining that the execution condition is met, wherein the conditional PSCell change procedure includes determining the initial state of the target PSCell, wherein the initial state of the target PSCell is determined as the specific state, while the validity timer is running, and wherein the initial state of the target PSCell is determined same as a current state of the current PSCell, after the validity timer expires.

2. The method of claim 1, wherein the conditional PSCell change configuration further includes information informing whether the target PSCell supports a de-activated state.

3. The method of claim 2, wherein the initial state of the target PSCell is determined as an activated state, based on the target PSCell does not support a de-activated state.

4. The method of claim 1, wherein the method further comprises, starting the validity timer upon receiving the conditional PSCell change configuration.

5. The method of claim 1, wherein the method further comprises, evaluating the execution condition related to the target PSCell.

6. The method of claim 1, wherein the conditional PSCell change configuration is signalled via a Radio Resource Control (RRC) message.

7. The method of claim 6, wherein the RRC message is an RRC re-configuration message.

8. The method of claim 1,
wherein the initial state of the target PSCell is either an activated state or a deactivated state.

9. The method of claim 1,
wherein the current state of the current PSCell is either an activated state or a deactivated state.

10. The method of claim 1, wherein the method further comprises,
considering that state of all serving cells which belong to a Secondary Cell Group (SCG), where the target PSCell belongs, as an activated state, based on that state of the target PSCell is determined as an activated state.

11. The method of claim 1, wherein the method further comprises,
transmitting and/or receiving data via the target PSCell without an activation command for the target PSCell, based on that the initial state of the target PSCell is determined as an activated state.

12. The method of claim 1, wherein the method further comprises,
transmitting and/or receiving data via the target PSCell after receiving an activation command for the target PSCell, based on that the initial state of the target PSCell is determined as a deactivated state.

13. The method of claim 1, wherein the wireless device is in communication with at least one of a user equipment, a network, or an autonomous vehicle other than the wireless device.

14. A wireless device configured to operate in a wireless communication system, the wireless device comprising:
a transceiver;
a memory; and
at least one processor operatively coupled to the transceiver and the memory, and configured to:
control the transceiver to receive, from a network, a conditional Primary SCG Cell (PSCell) change configuration related to a target PSCell including (1) an execution condition and (2) information informing a specific state of the target PSCell, as an initial state of the target PSCell, and a validity timer; and
perform a conditional PSCell change procedure from a current PSCell to the target PSCell based on determining that the execution condition is met, wherein the conditional PSCell change procedure includes determining the initial state of the target PSCell,
wherein the initial state of the target PSCell is determined as the specific state, while the validity timer is running, and
wherein the initial state of the target PSCell is determined same as a current state of the current PSCell, after the validity timer expires.

15. The wireless device of claim 14,
wherein the conditional PSCell change configuration further includes information informing whether the target PSCell supports a de-activated state.

16. The wireless device of claim 15,
wherein the initial state of the target PSCell is determined as an activated state, based on the target PSCell does not support a de-activated state.

17. The wireless device of claim 14, wherein the at least one processor further configured to,
start the validity timer upon receiving the conditional PSCell change configuration.

18. The wireless device of claim 14, wherein the at least one processor further configured to,
evaluate the execution condition related to the target PSCell.

19. The wireless device of claim 14,
wherein the conditional PSCell change configuration is signalled via a Radio Resource Control (RRC) message.

20. A base station configured to operate in a wireless communication system, the base station comprising:
a transceiver;
a memory; and
a processor operatively coupled to the transceiver and the memory, and configured to:
generate a conditional Primary SCG Cell (PSCell) change configuration related to a target PSCell including (1) an execution condition and (2) information informing a specific state of the target PSCell, as an initial state of the target PSCell, and a validity timer; and
control the transceiver to transmit, to a wireless device, the generated conditional PSCell change configuration.

* * * * *